United States Patent
Liu et al.

(10) Patent No.: US 12,143,967 B1
(45) Date of Patent: Nov. 12, 2024

(54) METHOD AND ACCESS POINT FOR SELECTING CANDIDATE CHANNEL IN WIRELESS LOCAL AREA NETWORK

(71) Applicant: TP-LINK CORPORATION PTE. LTD., Singapore (SG)

(72) Inventors: Xiang Liu, Shenzhen (CN); Shengbo Zhang, Shenzhen (CN); Rui Chen, Shenzhen (CN)

(73) Assignee: TP-LINK CORPORATION PTE. LTD, Singapore (SG)

( * ) Notice: Subject to any disclaimer, the term of this patent is extended or adjusted under 35 U.S.C. 154(b) by 0 days.

(21) Appl. No.: 18/655,311

(22) Filed: May 5, 2024

(51) Int. Cl.
  *H04W 72/02* (2009.01)
  *H04W 72/0453* (2023.01)
  *H04W 72/542* (2023.01)
  *H04W 72/543* (2023.01)

(52) U.S. Cl.
  CPC ....... *H04W 72/02* (2013.01); *H04W 72/0453* (2013.01); *H04W 72/542* (2023.01); *H04W 72/543* (2023.01)

(58) Field of Classification Search
  CPC ............. H04W 72/02; H04W 72/0453; H04W 72/542; H04W 72/543
  See application file for complete search history.

(56) References Cited

U.S. PATENT DOCUMENTS

| | | | | |
|---|---|---|---|---|
| 2010/0322073 | A1* | 12/2010 | Namba | H04L 5/0007 370/252 |
| 2011/0009139 | A1* | 1/2011 | Nagata | H04W 24/10 455/507 |
| 2012/0213204 | A1 | 8/2012 | Noh | |
| 2017/0026970 | A1* | 1/2017 | Pack | H04W 48/18 |
| 2017/0104647 | A1* | 4/2017 | Chaiyochlarb | H04L 43/55 |

FOREIGN PATENT DOCUMENTS

| | | |
|---|---|---|
| CN | 104168662 B | 7/2018 |
| CN | 112166639 A | 1/2021 |
| CN | 115696477 A | 2/2023 |

* cited by examiner

*Primary Examiner* — Ayanah S George
(74) *Attorney, Agent, or Firm* — Loeb & Loeb LLP

(57) ABSTRACT

This disclosure provides a method, an access point (AP) and a computer program product for selecting a candidate channel from a set of channels in a wireless local area network. The set of channels include elementary channels and combination channels. The method is implemented by an AP and includes: obtaining first wireless channel state indication for each elementary channel; calculating a first quality score for each elementary channel based on the first wireless channel state indication; calculating a second quality score for each combination channel, wherein each combination channel includes a first elementary channel and a second elementary channel, and the second quality score is calculated based on both the first wireless channel state indication for the first elementary channel and the first wireless channel state indication for the second elementary channel; and selecting a channel with highest quality score from the set of channels as the candidate channel.

20 Claims, 4 Drawing Sheets

METHOD AND ACCESS POINT FOR SELECTING CANDIDATE CHANNEL IN WIRELESS LOCAL AREA NETWORK

TECHNICAL FIELD

The present disclosure relates to wireless local area network (WLAN) communication, and more specifically, to a method and an access point (AP) for selecting a candidate channel in a wireless local area network.

BACKGROUND

With the development of communication technology, WLAN technology based on IEEE 802.11 standard has been widely used. WLAN technology allows wireless access at home or in enterprises or at a specific service provision region using mobile terminals, such as a Personal Digital Assistant (PDA), a laptop computer, a Portable Multimedia Player (PMP), etc. on the basis of Radio Frequency (RF) technology.

FIG. 1 shows an exemplary division of the 2.4 GHz band. In the WLAN standard protocol, the 2.4 GHz band can be divided into 14 elementary channels. The mostly used channels are the first 13 elementary channels numbered as channels 1 to 13, each with a bandwidth of 22 MHz (with 2 MHz functioning as a protection and isolation band) and a frequency offset of 5 MHz. Elementary channels 1 to 13 are usually called 20 MHz channels. Two elementary channels, one of which is called a primary channel and the other of which is called a secondary channel, may form a 40 MHz channel, which is called a combination channel herein. For example, in FIG. 1, channel 1 and channel 5 may form a 40 MHz channel, channel_1_5, with the channel 1 as the primary channel and the channel 5 as the secondary channel.

One of the building blocks for the WLAN is a BSS (Basic Service Set). Each BSS may comprise a plurality of stations (STAs) and an AP. Communication between STAs (through the AP) within the BSS may utilize a 20 MHz channel or a 40 MHz channel. For example, STAs in a first BSS may communicate via the 40 MHz channel, channel_1_5, and STAs in a second BSS may communicate via the 20 MHz channel, channel 5. Since at least a portion of the channel 5 is also contained within the channel_15, the first and second BSSs may be referred to as overlapping BSSs (OBSS). In this case, there may be conflicts when communications between STAs within the first BSS and communications between STAs within the second BSS occur concurrently.

SUMMARY

The present disclosure provides techniques for improving selection of a candidate channel to be used for a BSS, especially in an OBSS scenario, which in turn improves overall performance of the BSS. In particular, the present disclosure provides a method, an AP, and a computer program product for selecting a candidate channel from a set of channels in a wireless local area network, which gives a more reasonable estimate for a channel quality of the combination channel, enables a channel with the best performance to be selected, and in turn improves performance of a BSS which comprises the AP.

According to an aspect of the present disclosure, there is provided a method for selecting a candidate channel from a set of channels in a wireless local area network. The set of channels can comprise elementary channels and combination channels. The method can be performed by an access point (AP) and comprises: obtaining first wireless channel state indication for each elementary channel in the set of channels; calculating a first quality score for each elementary channel in the set of channels based on the first wireless channel state indication; calculating a second quality score for each combination channel in the set of channels, wherein each combination channel comprises a first elementary channel and a second elementary channel different from the first elementary channel in the set of channels, and the second quality score is calculated based on both the first wireless channel state indication for the first elementary channel and the first wireless channel state indication for the second elementary channel; and selecting a channel with the highest quality score from the set of channels as the candidate channel.

In some embodiments, the calculating the second quality score for each combination channel in the set of channels can be based on the first quality score for the first elementary channel and the first quality score for the second elementary channel.

In some embodiments, the calculating the second quality score for each combination channel in the set of channels can comprise adding the first quality score for the first elementary channel and the first quality score for the second elementary channel and further subtracting a predetermined quality score threshold.

In some embodiments, the calculating the second quality score for each combination channel in the set of channels can comprise performing a weighted sum of the first quality score for the first elementary channel and the first quality score for the second elementary channel.

In some embodiments, the method can further comprise: obtaining second wireless channel state indication for each elementary channel in the set of channels; and if the first quality score for each elementary channel and the second quality score for each combination channel are below a predetermined threshold, selecting an elementary channel from the set of channels based on the second wireless channel state indication as the candidate channel.

In some embodiments, the method can further comprise: obtaining second wireless channel state indication for each channel in the set of channels; and if the first quality score for each elementary channel and the second quality score for each combination channel are below a predetermined threshold, selecting a channel from the set of channels based on the second wireless channel state indication as the candidate channel.

In some embodiments, the first wireless channel state indication for each elementary channel can comprise at least one of a transmission ratio TR, a reception ratio RR and a utilization ratio UR for the elementary channel, the TR represents a percentage of time that the AP sends packets in a first predetermined time interval on the elementary channel, the RR represents a percentage of time that the AP receives packets in a second predetermined time interval on the elementary channel, and the UR represents a channel utilization ratio of the elementary channel.

In some embodiments, the calculating the first quality score for each elementary channel in the set of channels based on the first wireless channel state indication can comprise: calculating a weighted sum of the TR, the RR and the UR of the elementary channel as the first quality score for the elementary channel.

In some embodiments, the second wireless channel state indication for each elementary channel can comprise a ratio of error packets on the elementary channel.

In some embodiments, each elementary channel has a bandwidth of 20 MHz.

In some embodiments, the obtaining is performed when the AP is powered on, periodically, when a channel quality of an operating channel is below a predefined threshold, or initiated by a user.

According to another aspect of the present disclosure, there is provided an access point (AP) configured to select a candidate channel from a set of channels in a wireless local area network. The set of channels can comprise elementary channels and combination channels. The AP can comprise: one or more processors; a memory coupled to at least one of the processors; and a set of computer program instructions stored in the memory, which, when executed by at least one of the processors, perform the following actions: obtaining first wireless channel state indication for each elementary channel in the set of channels; calculating a first quality score for each elementary channel in the set of channels based on the first wireless channel state indication; calculating a second quality score for each combination channel in the set of channels, wherein each combination channel comprises a first elementary channel and a second elementary channel different from the first elementary channel in the set of channels, and the second quality score is calculated based on both the first wireless channel state indication for the first elementary channel and the first wireless channel state indication for the second elementary channel; and selecting a channel with the highest quality score from the set of channels as the candidate channel.

According to yet another aspect of the present disclosure, there is provided a computer program product for selecting a candidate channel from a set of channels in a wireless local area network. The set of channels can comprise elementary channels and combination channels. The computer program product can comprise a non-transitory computer readable storage medium having program instructions embodied therewith, the program instructions are executable by a processor of an access point (AP) to cause the processor to: obtain first wireless channel state indication for each elementary channel in the set of channels; calculate a first quality score for each elementary channel in the set of channels based on the first wireless channel state indication; calculate a second quality score for each combination channel in the set of channels, wherein each combination channel comprises a first elementary channel and a second elementary channel different from the first elementary channel in the set of channels, and the second quality score is calculated based on both the first wireless channel state indication for the first elementary channel and the first wireless channel state indication for the second elementary channel; and select a channel with the highest quality score from the set of channels as the candidate channel.

At least based on the above embodiments of the present disclosure, a more reasonable estimate for the channel quality of the combination channel (for example, the 40 MHz channel) can be determined, a channel with the best performance can be selected, and performance of a BSS which comprises the AP can be improved accordingly.

BRIEF DESCRIPTION OF DRAWINGS

The above and other objects, features and advantages of the present disclosure will become more apparent by describing embodiments of the present disclosure in more detail in conjunction with accompanying drawings. The drawings are used to provide a further understanding of the embodiments of the present disclosure and constitute a part of the specification. The drawings together with the embodiments of the present disclosure are used to explain the present disclosure, but do not constitute a limitation on the present disclosure. In the drawings, unless otherwise explicitly indicated, the same reference numerals refer to the same components, steps or elements.

DETAILED DESCRIPTION

The technical solution of the present disclosure will be clearly and completely described below in conjunction with accompanying drawings. Obviously, the described embodiments are part of embodiments of the present disclosure, but not all of them. Based on the embodiments in the present disclosure, all other embodiments obtained by ordinary skilled in the art without making any creative efforts fall within the scope of protection of the present disclosure.

In the description of the present disclosure, it should be noted that terms such as "first", "second" and "third" are only for descriptive purposes, whereas cannot be understood as indicating or implying relative importance. Likewise, words like "a", "an" or "the" do not represent a quantity limit, but represent an existence of at least one. Words like "include" or "comprise" mean that an element or an object in front of said word encompasses those ones listed following the said word and their equivalents, without excluding other elements or objects.

In addition, technical features involved in different embodiments of the present disclosure described below may be combined with each other as long as no conflicts occur therebetween.

Figure 1:
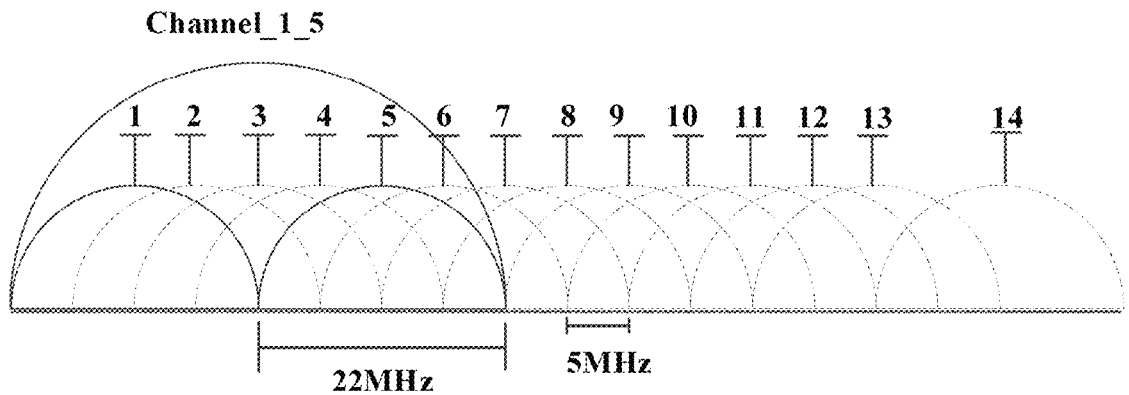
FIG. 1 shows an exemplary division of the 2.4 GHz band of a WLAN.

At present, since there are more and more home network devices and the frequency band range of 2.4 GHz band itself is narrow, the existing solutions will make an AP operate in the 20 MHz channel with a high probability so as to avoid the conflicts mentioned in the BACKGROUND portion. For example, assuming an AP of a first BSS operates in a 40 MHz channel, including a 20 MHz elementary channel 1 (primary channel) and a 20 MHz elementary channel 5 (secondary channel) as shown in FIG. 1. The AP will check if there is any OBSS operating in the channel 1 or channel 5. If, for example, a second BSS also operates in the 20 MHz elementary channel 5, the AP may be required to fall back to operating only in channel 1 (20 MHz) according to existing solutions, regardless of whether the second BSS is idle or not, so as to avoid the conflicts. However, if the second BSS is idle during a time period, a better performance may be obtained for the first BSS by allowing the AP to operate in the 40 MHz channel for that time period. Therefore, the first BSS cannot always achieve the optimization of its performance in the scenario of the OBSS according to existing solutions.

In addition, in terms of determining channel quality estimate for a 40 MHz channel, the worse one of the channel quality of the primary channel of the 40 MHz channel and the channel quality of the secondary channel of the 40 MHz channel may be deemed as the channel quality of the overall 40 MHz channel, which in some cases does not give a reasonable estimate for the channel quality of the overall 40 MHz channel. Still taking the above example, the AP of the first BSS operates in the 40 MHz channel including the primary channel 1 and the secondary channel 5. Assuming that there is interference in channel 5, then the channel quality of channel 5, which is relatively poor as compared with the channel quality of channel 1, may be deemed as the channel quality of the overall 40 MHz channel, and the AP may be required to refrain from operating in the 40 MHz channel including channel 1 and channel 5, but only operate in channel 1. However, the performance of 40 MHz channel may still be better than the 20 MHz channel 1, for example when the second BSS is idle.

In view of the above problems, the present disclosure provides a method, an AP and a computer program product for selecting a candidate channel from a set of channels in a wireless local area network, which may give a more reasonable estimate for a channel quality of the combination channel, enable a channel with the best performance to be selected, and in turn improve performance of a BSS which comprises the AP.

Figure 2:
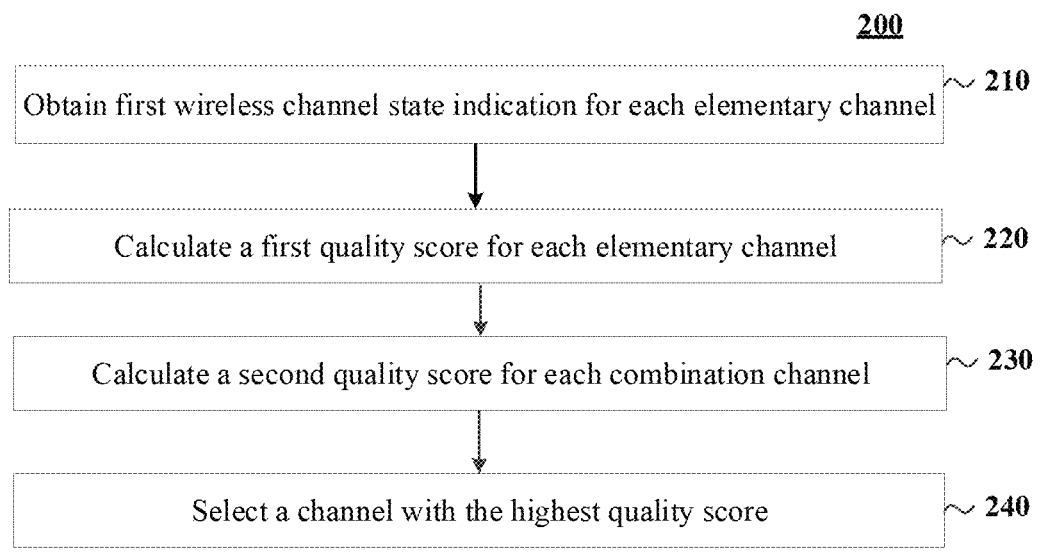
FIG. 2 shows a flowchart of a method for selecting a candidate channel from a set of channels in a wireless local area network according to an embodiment of the present disclosure.

With reference now to FIG. 2, it is shown a flowchart of a method 200 for selecting a candidate channel from a set of channels in a wireless local area network according to an embodiment of the present disclosure. The set of channels may include elementary channels and combination channels. In some embodiments, an elementary channel may have a bandwidth of 20 MHz and may be one of the channels 1 to 13 as stated above. In some embodiments, a combination channel may be a 40 MHz channel as stated above, which includes two elementary channels, i.e., a first elementary channel (the primary channel) and a second elementary channel (the secondary channel) different from the first elementary channel in the set of channels. The first elementary channel and the second elementary channel may be adjacent non-interfering elementary channels. The method 200 can performed by an AP.

At step 210, first wireless channel state indication for each elementary channel in the set of channels can be obtained. The first wireless channel state indication may be any state indication comprising one or more channel state parameters associated with a channel quality of the elementary channel known in the art.

In some embodiments, the first wireless channel state indication for each elementary channel may include at least one of a transmission ratio TR, a reception ratio RR and a utilization ratio UR for the elementary channel. The TR herein represents a percentage of time that the AP sends packets in a first predetermined time interval on the elementary channel. The first predetermined time interval may be any time period predetermined for the AP. For example, the AP may send packets for 50 ms in a first predetermined time interval of 100 ms on channel 1 as shown in FIG. 1, and thus the TR for the channel 1 is equal to 50 ms/100 ms=0.5. The RR herein represents a percentage of time that the AP receives packets in a second predetermined time interval on the elementary channel. The second predetermined time interval may also be any time period predetermined for the AP. The first predetermined time interval may be the same as or different from the second predetermined time interval. For example, the AP may receive packets for 20 ms in a second predetermined time interval of 80 ms on channel 1 shown in FIG. 1, and thus the RR for the channel 1 is equal to 20 ms/80 ms=0.25. The UR herein represents a channel utilization ratio of the elementary channel, which indicates what percentage of time the elementary channel is utilized (with data passing through). For example, if the elementary channel is busy for 30 ms, and idle for 30 ms, the channel utilization ratio of the elementary channel is equal to 30 ms/(30 ms+30 ms)=0.5.

Step 210 may be performed at suitable timings. For example, step 210 can be performed when the AP is powered on, so that a candidate channel for the AP to operate in can be subsequently selected through method 200. Step 210 can also be performed periodically, so that a candidate channel with best performance for the AP can be determined periodically through method 200 and the AP can periodically switch to operate in a channel with best performance. Step 210 can also be performed when a channel quality of an operating channel is below a predefined threshold. The operating channel herein refers to the channel in which the AP is currently operating, and the predefined threshold can be determined according to user's requirement. In this case, the AP can switch to a channel with potential better performance whenever the channel quality does not meet the user's requirement. Step 210 can also be initiated by a user, so that the user can choose the timing for channel optimization according to experience or preference.

At step 220, a first quality score for each elementary channel in the set of channels can be calculated based on the first wireless channel state indication. The first quality score for an elementary channel is a channel quality estimate of the elementary channel. In some embodiments, step 220 may include calculating a weighted sum of the TR, the RR and the UR of the elementary channel as the first quality score for the elementary channel. In some embodiments, weighting factors for the TR, the RR and the UR may be predetermined according to experiments or experience. In some embodiments, weighting factors for the TR, the RR and the UR may be set as 1, in other words, the first quality score may be a sum of the TR, the RR and the UR.

At step 230, a second quality score for each combination channel in the set of channels can be calculated. The second quality score for a combination channel is a channel quality estimate of the combination channel. As described above, each combination channel may comprise a first elementary channel and a second elementary channel different from the first elementary channel in the set of channels. The second quality score for each combination channel can be calculated based on both the first wireless channel state indication for the first elementary channel and the first wireless channel state indication for the second elementary channel. Step 230 takes into consideration the performance impacts of both the first elementary channel and the second elementary channel of the combination channel, and therefore can give a more reasonable estimate for the channel quality of the overall combination channel.

In some embodiments, the second quality score for each combination channel in the set of channels can be calculated directly based on the first wireless channel state indication obtained at step 210, while in some embodiments, the second quality score for each combination channel in the set of channels can be calculated based on the first quality scores calculated at step 220. In the latter case, the second quality score for a combination channel can be calculated based on the first quality score for the first elementary channel of the combination channel and the first quality score for the second elementary channel of the combination channel. For example, if the combination channel is channel_1_5 consisting of channel 1 and channel 5 as shown in FIG. 1, then the second quality score for channel_1_5 can be calculated based on both the first quality score for channel 1 and the first quality score for channel 5.

In some embodiments, step 230 can include adding the first quality score for the first elementary channel and the first quality score for the second elementary channel, and further subtracting a predetermined quality score threshold. The predetermined quality score threshold can be determined according to experiments or experience, to ensure that the calculated second quality scores for combination channels and the calculated first quality scores for elementary channels are comparable. For example, if an elementary channel (for example, channel 6) and a combination channel (for example, channel_1_5) exhibit the same performance (for example, the same data transmission rate), they should have the same or similar quality scores. Then the predetermined quality score threshold can be determined as a difference between the sum of the quality scores of the two elementary channels of the combination channel (for example, channel_1_5) and the quality score of the elementary channel (for example, channel 6), which in this case should be equal to (the first quality score of channel 1+the first quality score of channel 5−the first quality score of channel 6).

In some embodiments, step 230 can include performing a weighted sum of the first quality score for the first elementary channel of the combination channel and the first quality score for the second elementary channel the combination channel. A sum of a first weighting factor for the first quality score for the first elementary channel and a second weighting factor for the first quality score for the second elementary channel may be 1, so as to ensure that second quality scores for combination channels and first quality scores for elementary channels are comparable.

At step 240, a channel with the highest quality score from the set of channels can be selected as the candidate channel. The higher the quality score is, the better the performance of a corresponding channel is. Therefore, at step 240, an elementary channel or a combination channel among the set of channels, whichever has the highest quality score, can be selected as the candidate channel for the AP to operate in. Since the calculation at step 230 gives a more reasonable estimate for the channel quality of the overall combination channel, the selection at step 240 may result in a combination channel still being selected in a scenario of OBSS, and thus a channel with better performance can be selected as the candidate channel, improving performance of the BSS which comprises the AP.

According to embodiments of the present disclosure, a more reasonable estimate for a channel quality of the combination channel can be calculated, a channel with the best performance can be selected, and performance of a BSS which comprises the AP can be improved accordingly.

In some circumstances, the first quality score for each elementary channel and the second quality score for each combination channel may be relatively low, for example, below a predetermined threshold, which indicates that the channel conditions of all the channels are poor under the current evaluation criterion. In this case, the selection of any channel under the current evaluation criterion may not result in good performance for the AP. Therefore, another wireless channel state indication different from the first wireless channel state indication may be used to evaluate conditions of the channels.

Figure 3:
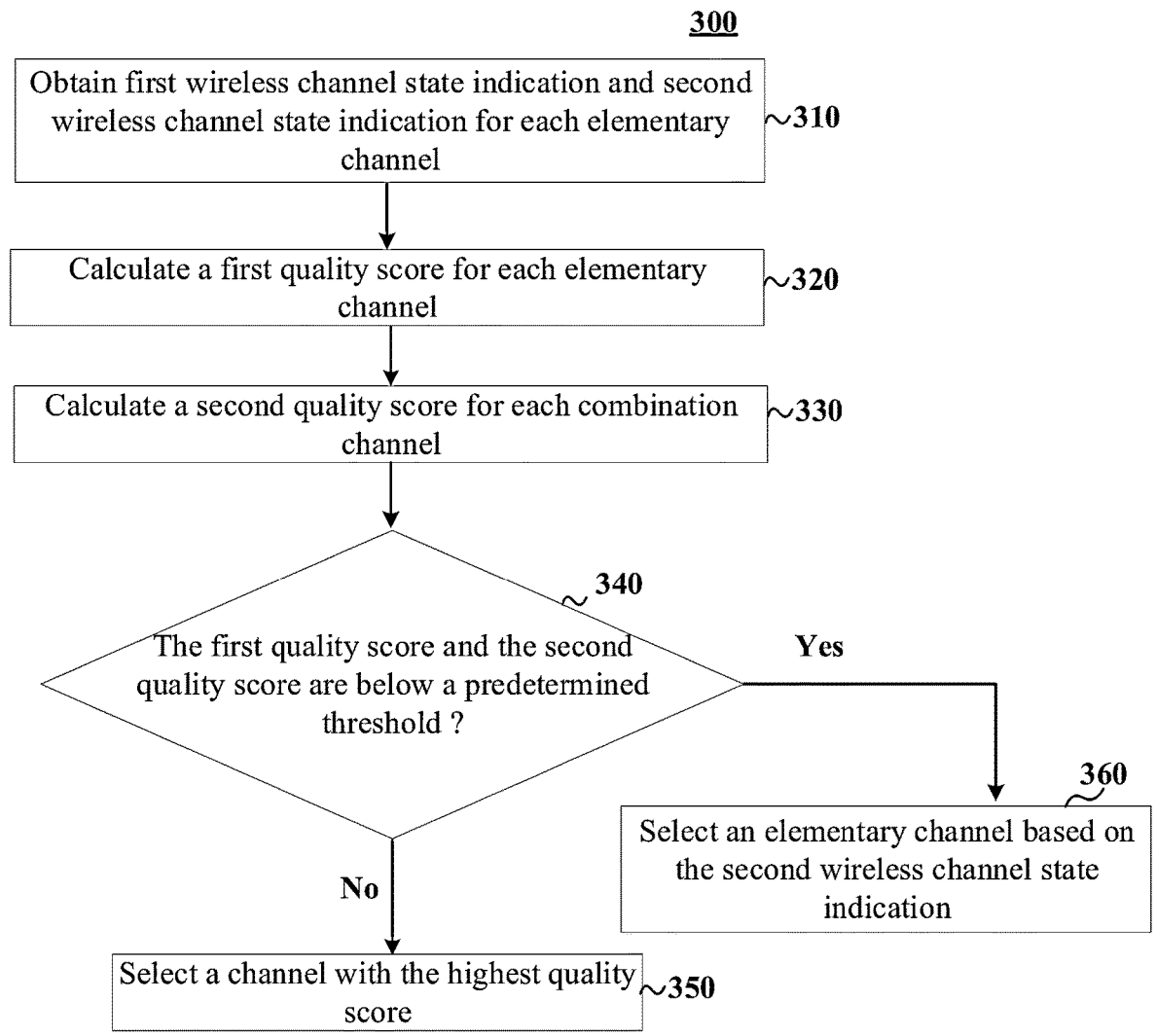
FIG. 3 shows a flowchart of a method for selecting a candidate channel from a set of channels in a wireless local area network according to another embodiment of the present disclosure.

FIG. 3 shows a flowchart of a method 300 for selecting a candidate channel from a set of channels in a wireless local area network according to another embodiment of the present disclosure. As shown in FIG. 3, the method 300 may include steps 310-360, steps 320, 330 and 350 correspond to steps 220, 230 and 240 respectively, and detailed description thereof will be omitted for conciseness.

As shown in FIG. 3, method 300 differs from method 200 in steps 310, 340 and 360. At step 310, in addition to obtaining first wireless channel state indication for each elementary channel as step 210, second wireless channel state indication for each elementary channel in the set of channels can also be obtained. The second wireless channel state indication may comprise one or more channel state parameters that are different from the channel state parameters comprised in the first wireless channel state indication. As stated above, in some embodiments, the first wireless channel state indication for each elementary channel may include at least one of a TR, an RR and a UR for the elementary channel. Then the second wireless channel state indication for each elementary channel may comprise a ratio of error packets on the elementary channel.

At step 340, a determination is made on whether the first quality score for each elementary channel calculated at step 320 and the second quality score for each combination channel calculated at step 330 are below a predetermined threshold. If the determination made at step 340 is negative (No), which indicates that the channel performance can be evaluated based on the first wireless channel state indication, method 300 can proceed to step 350, where it selects a channel with the highest quality score from the set of channels as the candidate channel, as described in method 200.

If the determination made at step 340 is positive (Yes), which indicates that the channel conditions of all the channels are poor based on the first wireless channel state indication, method 300 can proceed to step 360, where it uses the second wireless channel state indication to evaluate conditions of the channels. Specifically, at step 360, an elementary channel from the set of channels can be selected as the candidate channel based on the second wireless channel state indication. In method 300, if the channel conditions of all the channels are deemed as poor at step 340, it may indicate that all the usable frequencies are busy, and thus it is preferred to use less frequencies. Accordingly, method 300 gives up using any combination channel as the candidate channel by deeming that all the combination channels may not be good choices, but only considers the elementary channels. The performance of the elementary channels can be evaluated based on the second wireless channel state indication, and the elementary channel with the best performance can be selected as the candidate channel. For example, as stated above, the second wireless channel state indication for each elementary channel may comprise a ratio of error packets on the elementary channel. Under this circumstance, the elementary channel with the least ratio of error packets can be selected as the candidate channel.

According to embodiments of the present disclosure, a more reasonable estimate for a channel quality of the combination channel can be calculated, different wireless channel state indication can be considered in a hierarchical sequence during performance evaluation of channels, therefore a channel with the best performance can be selected, and performance of a BSS which comprises the AP can be improved accordingly.

Figure 4:
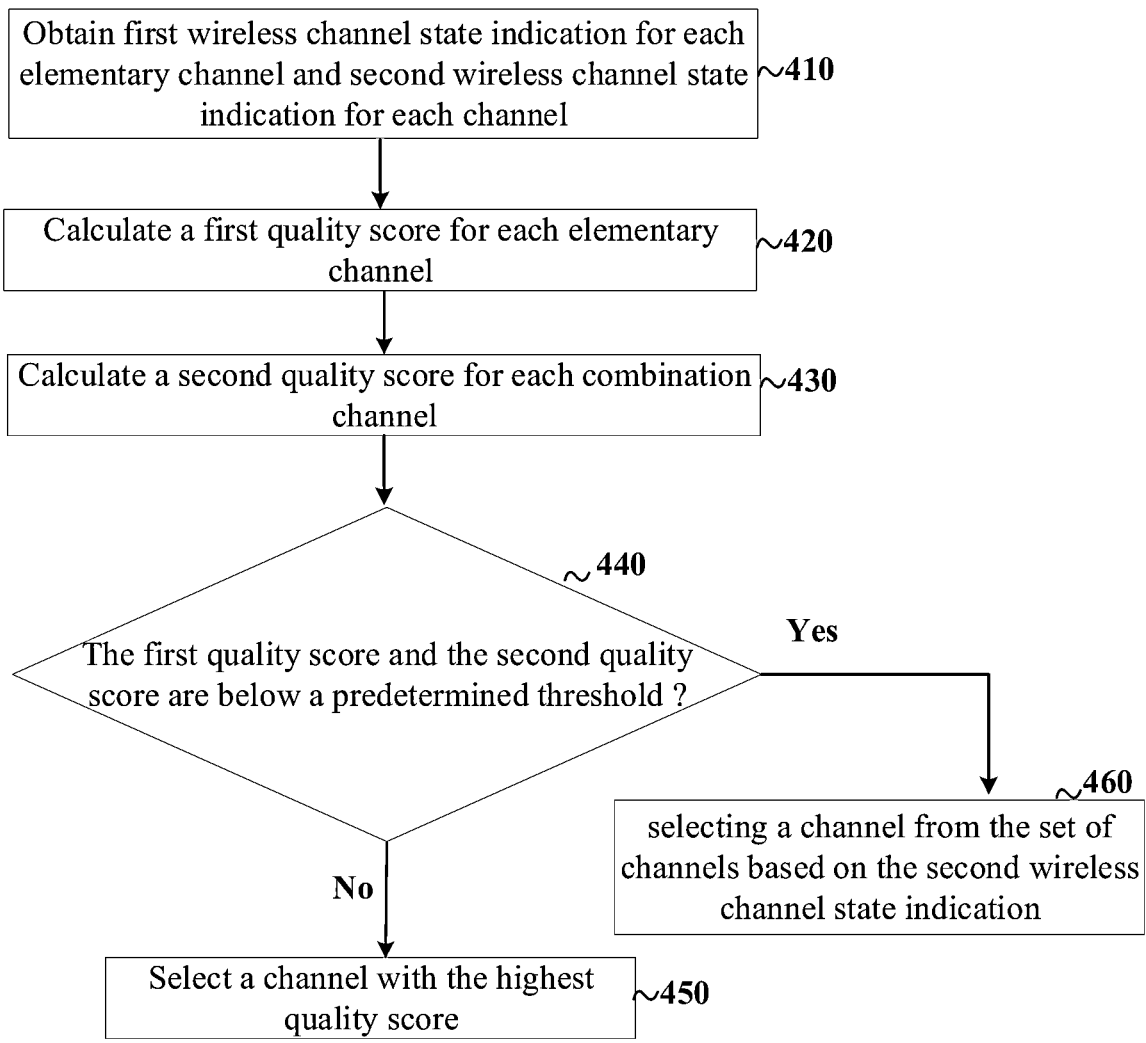
FIG. 4 shows a flowchart of a method for selecting a candidate channel from a set of channels in a wireless local area network according to yet another embodiment of the present disclosure.

In some embodiments, different from the method 300 which gives up using any combination channel as the candidate channel if the channel conditions of all channels are deemed as poor based on the first wireless channel state indication, the combination channels may also be considered to be possible candidate channels. FIG. 4 shows a flowchart of a method 400 for selecting a candidate channel from a set of channels in a wireless local area network according to yet another embodiment of the present disclosure, which involves the above consideration.

As shown in FIG. 4, the method 400 may include steps 410-460, steps 420, 430, 440 and 450 correspond to steps 320, 330, 340 and 350 respectively, and detailed description thereof will be omitted for conciseness.

As shown in FIG. 4, method 400 differs from method 300 in steps 410 and 460. At step 410, first wireless channel state indication for each elementary channel and second wireless channel state indication for each channel can be obtained. The second wireless channel state indication for each channel herein refers to second wireless channel state indication for each elementary channel and each combination channel in the set of channels. The second wireless channel state indication may comprise one or more channel state parameters that are different from the channel state parameters comprised in the first wireless channel state indication. Step 410 differs from step 310 in that second wireless channel state indication for each combination channel in the set of channels are additionally obtained. Therefore, with the additional second wireless channel state indication for each combination channel obtained at step 410 as compared with step 310, at step 460, a channel from the set of channels, either an elementary channel or a combination channel, can be selected as the candidate channel based on the second wireless channel state indication.

According to embodiments of the present disclosure, a more reasonable estimate for a channel quality of the combination channel can be calculated, different wireless channel state indication can be considered in a hierarchical sequence during performance evaluation of channels, therefore a channel with the best performance can be selected, and performance of a BSS which comprises the AP can be improved accordingly.

Figure 5:
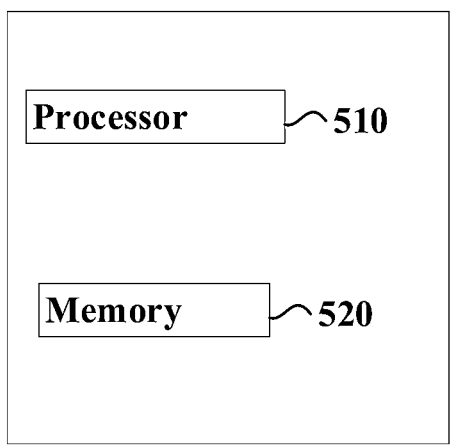
FIG. 5 is an exemplary block diagram illustrating an AP according to an embodiment of the present disclosure.

FIG. 5 is an exemplary block diagram illustrating an AP 500 according to an embodiment of the present disclosure. It should be noted that the AP 500 depicted in FIG. 5 can be used to perform the operations of selecting a candidate channel from a set of channels in a wireless local area network, for example, respective method 200 or method 400 as described above.

As shown in FIG. 5, the AP 500 can comprise one or more processors 501 and a memory 502. The one or more processors 501 are communicatively coupled with the memory 502 and configured to perform the methods discussed above.

Examples of the one or more processors 501 comprise microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

The one or more processors 501 can execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on memory 502.

The memory 502 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read-only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The memory 502 may reside in the one or more processors 501, external to the one or more processors 501, or distributed across multiple entities including the one or more processors 501. The memory 502 may be embodied in a computer program product. By way of example, a computer program product may include a computer-readable medium in packaging materials. Those skilled in the art will recognize how to implement the described functionality presented throughout this disclosure depending on the particular application and the overall design constraints imposed on the overall system.

In addition, according to another embodiment of the present disclosure, a computer program product for selecting a candidate channel from a set of channels in a wireless local area network is disclosed. As an example, the computer program product comprises a non-transitory computer readable storage medium having program instructions embodied therewith, and the program instructions are executable by a processor of an AP. When executed, the program instructions cause the processor to perform one or more of the described procedures above, and details are omitted herein for conciseness.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

Expression such as "according to", "based on", "dependent on", and so on as used in the disclosure does not mean "according only to", "based only on", or "dependent only on", unless it is explicitly otherwise stated. In other words, such expression generally means "according at least to", "based at least on", or "dependent at least on" in the disclosure.

Any reference in the disclosure to an element using the designation "first", "second" and so forth is not intended to comprehensively limit the number or order of such elements. These expressions can be used in the disclosure as a convenient method for distinguishing two or more units. Thus, a reference to a first unit and a second unit does not imply that only two units can be employed or that the first unit must precede the second unit in some form.

The term "determining" used in the disclosure can include various operations. For example, regarding "determining", calculating, computing, processing, deriving, investigating, looking up (e.g., looking up in tables, databases, or other data structure), ascertaining, and so forth are regarded as "determination". In addition, regarding "determining", receiving (for example, receiving information), transmitting (for example, transmitting information), input, output, accessing (for example, access to data in the memory), and so forth, are also regarded as "determining". In addition, regarding "determining", resolving, selecting, choosing, establishing, comparing, and so forth can also be regarded as "determining". That is, regarding "determining", several actions can be regarded as "determining".

The terms such as "connected", "coupled" or any of their variants used in the disclosure refer to any connection or combination, direct or indirect, between two or more units, which can include the following situations: between two units that are "connected" or "coupled" with each other, there are one or more intermediate units. The coupling or connection between the units can be physical or logical, or can also be a combination of the two. As used in the disclosure, two units can be considered to be electrically connected through the use of one or more wires, cables, and/or printed, and as a number of non-limiting and non-exhaustive examples, and are "connected" or "coupled" with each other through the use of electromagnetic energy with wavelengths in a radio frequency region, the microwave region, and/or in the light (both visible and invisible) region, and so forth.

When used in the disclosure or the claims 'including", "comprising", and variations thereof, these terms are as open-ended as the term "having". Further, the term "or" used in the disclosure or in the claims is not an exclusive-or.

The present disclosure has been described in detail above, but it is obvious to those skilled in the art that the present disclosure is not limited to the embodiments described in the disclosure. The present disclosure can be implemented as a modified and changed form without departing from the spirit and scope of the present disclosure defined by the description of the claims. Therefore, the description in the disclosure is for illustration and does not have any limiting meaning to the present disclosure.

What is claimed is:

1. A method for selecting a candidate channel from a set of channels in a wireless local area network, the set of channels comprising elementary channels and combination channels, the method being performed by an access point (AP) and comprising:
    obtaining first wireless channel state indication for each elementary channel in the set of channels;
    calculating a first quality score for each elementary channel in the set of channels based on the first wireless channel state indication;
    calculating a second quality score for each combination channel in the set of channels, wherein each combination channel comprises a first elementary channel and a second elementary channel different from the first elementary channel in the set of channels, and the second quality score is calculated based on both the first wireless channel state indication for the first elementary channel and the first wireless channel state indication for the second elementary channel; and
    selecting a channel with the highest quality score from the set of channels as the candidate channel.

2. The method of claim 1, wherein the calculating the second quality score for each combination channel in the set of channels is based on the first quality score for the first elementary channel and the first quality score for the second elementary channel.

3. The method of claim 2, wherein the calculating the second quality score for each combination channel in the set of channels comprises adding the first quality score for the first elementary channel and the first quality score for the second elementary channel and further subtracting a predetermined quality score threshold.

4. The method of claim 2, wherein the calculating the second quality score for each combination channel in the set of channels comprises performing a weighted sum of the first quality score for the first elementary channel and the first quality score for the second elementary channel.

5. The method of claim 1, wherein the method further comprising:
    obtaining second wireless channel state indication for each elementary channel in the set of channels; and
    if the first quality score for each elementary channel and the second quality score for each combination channel are below a predetermined threshold, selecting an elementary channel from the set of channels based on the second wireless channel state indication as the candidate channel.

6. The method of claim 1, wherein the method further comprising:
    obtaining second wireless channel state indication for each channel in the set of channels; and
    if the first quality score for each elementary channel and the second quality score for each combination channel are below a predetermined threshold, selecting a channel from the set of channels based on the second wireless channel state indication as the candidate channel.

7. The method of claim 1, wherein the first wireless channel state indication for each elementary channel comprises at least one of a transmission ratio TR, a reception ratio RR and a utilization ratio UR for the elementary channel, the TR represents a percentage of time that the AP sends packets in a first predetermined time interval on the elementary channel, the RR represents a percentage of time that the AP receives packets in a second predetermined time interval on the elementary channel, and the UR represents a channel utilization ratio of the elementary channel.

8. The method of claim 7, wherein the calculating the first quality score for each elementary channel in the set of channels based on the first wireless channel state indication comprises:
    calculating a weighted sum of the TR, the RR and the UR of the elementary channel as the first quality score for the elementary channel.

9. The method of claim 5, wherein the second wireless channel state indication for each elementary channel comprises a ratio of error packets on the elementary channel.

10. The method of claim 1, wherein each elementary channel has a bandwidth of 20 MHz.

11. The method of claim 1, wherein the obtaining is performed when the AP is powered on, periodically, when a channel quality of an operating channel is below a predefined threshold, or initiated by a user.

12. An access point (AP) configured to select a candidate channel from a set of channels in a wireless local area network, the set of channels comprising elementary channels and combination channels, the AP comprising:
    one or more processors;
    a memory coupled to at least one of the processors; and
    a set of computer program instructions stored in the memory, which, when executed by at least one of the processors, perform actions of:
    obtaining first wireless channel state indication for each elementary channel in the set of channels;

calculating a first quality score for each elementary channel in the set of channels based on the first wireless channel state indication;

calculating a second quality score for each combination channel in the set of channels, wherein each combination channel comprises a first elementary channel and a second elementary channel different from the first elementary channel in the set of channels, and the second quality score is calculated based on both the first wireless channel state indication for the first elementary channel and the first wireless channel state indication for the second elementary channel; and selecting a channel with the highest quality score from the set of channels as the candidate channel.

13. The AP of claim 12, wherein the calculating the second quality score for each combination channel in the set of channels is based on the first quality score for the first elementary channel and the first quality score for the second elementary channel.

14. The AP of claim 13, wherein the calculating the second quality score for each combination channel in the set of channels comprises adding the first quality score for the first elementary channel and the first quality score for the second elementary channel and further subtracting a predetermined quality score threshold.

15. The AP of claim 13, wherein the calculating the second quality score for each combination channel in the set of channels comprises performing a weighted sum of the first quality score for the first elementary channel and the first quality score for the second elementary channel.

16. The AP of claim 12, wherein the set of computer program instructions when executed by at least one of the processors, further perform actions of:

obtaining second wireless channel state indication for each elementary channel in the set of channels; and if the first quality score for each elementary channel and the second quality score for each combination channel are below a predetermined threshold, selecting an elementary channel from the set of channels based on the second wireless channel state indication as the candidate channel.

17. The AP of claim 12, wherein the set of computer program instructions when executed by at least one of the processors, further perform actions of:

obtaining second wireless channel state indication for each channel in the set of channels; and if the first quality score for each elementary channel and the second quality score for each combination channel are below a predetermined threshold, selecting a channel from the set of channels based on the second wireless channel state indication as the candidate channel.

18. The AP of claim 12, wherein the first wireless channel state indication for each elementary channel comprises at least one of a transmission ratio TR, a reception ratio RR and a utilization ratio UR for the elementary channel, the TR represents a percentage of time that the AP sends packets in a first predetermined time interval on the elementary channel, the RR represents a percentage of time that the AP receives packets in a second predetermined time interval on the elementary channel, and the UR represents a channel utilization ratio of the elementary channel.

19. The AP of claim 18, wherein the calculating the first quality score for each elementary channel in the set of channels based on the first wireless channel state indication comprises:

calculating a weighted sum of the TR, the RR and the UR of the elementary channel as the first quality score for the elementary channel.

20. A computer program product for selecting a candidate channel from a set of channels in a wireless local area network, the set of channels comprising elementary channels and combination channels, the computer program product comprising a non-transitory computer readable storage medium having program instructions embodied therewith, the program instructions executable by a processor of an access point (AP) to cause the processor to:

obtain first wireless channel state indication for each elementary channel in the set of channels;

calculate a first quality score for each elementary channel in the set of channels based on the first wireless channel state indication;

calculate a second quality score for each combination channel in the set of channels, wherein each combination channel comprises a first elementary channel and a second elementary channel different from the first elementary channel in the set of channels, and the second quality score is calculated based on both the first wireless channel state indication for the first elementary channel and the first wireless channel state indication for the second elementary channel; and select a channel with the highest quality score from the set of channels as the candidate channel.

\* \* \* \* \*